United States Patent
Kim et al.

(10) Patent No.: US 10,040,911 B2
(45) Date of Patent: Aug. 7, 2018

(54) METHOD OF PREPARING SUPERABSORBENT POLYMER GRANULES

(71) Applicant: LG Chem, Ltd., Seoul (KR)

(72) Inventors: Kyu Pal Kim, Daejeon (KR); Chang Sun Han, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/502,611

(22) PCT Filed: Oct. 8, 2015

(86) PCT No.: PCT/KR2015/010684
§ 371 (c)(1),
(2) Date: Feb. 8, 2017

(87) PCT Pub. No.: WO2016/056867
PCT Pub. Date: Apr. 14, 2016

(65) Prior Publication Data
US 2017/0226295 A1    Aug. 10, 2017

(30) Foreign Application Priority Data
Oct. 8, 2014    (KR) .................. 10-2014-0135922

(51) Int. Cl.
| | |
|---|---|
| *C08J 3/07* | (2006.01) |
| *C08J 3/075* | (2006.01) |
| *C08J 3/20* | (2006.01) |
| *C08L 101/14* | (2006.01) |
| *B01J 20/26* | (2006.01) |
| *B01J 20/28* | (2006.01) |
| *C08J 3/12* | (2006.01) |
| *B01J 20/30* | (2006.01) |
| *C08F 6/00* | (2006.01) |

(52) U.S. Cl.
CPC ............. *C08J 3/075* (2013.01); *B01J 20/261* (2013.01); *B01J 20/265* (2013.01); *B01J 20/267* (2013.01); *B01J 20/28004* (2013.01); *B01J 20/3085* (2013.01); *C08F 6/008* (2013.01); *C08J 3/12* (2013.01); *C08J 3/20* (2013.01); *C08L 101/14* (2013.01); *C08J 2333/02* (2013.01)

(58) Field of Classification Search
CPC ....... C08J 3/07; C08J 3/075; C08J 3/12; B01J 20/261

USPC .......................................................... 502/402
See application file for complete search history.

(56) References Cited

U.S. PATENT DOCUMENTS

| | | | |
|---|---|---|---|
| 4,446,261 | A | 5/1984 | Yamasaki et al. |
| 5,002,986 | A | 3/1991 | Fujiura et al. |
| 5,350,799 | A | 9/1994 | Woodrum et al. |
| 6,323,252 | B1 | 11/2001 | Gartner et al. |
| 2005/0181200 | A1 | 8/2005 | Mertens et al. |
| 2005/0245393 | A1 | 11/2005 | Herfert et al. |
| 2006/0247351 | A1 | 11/2006 | Torii et al. |
| 2015/0259522 | A1 | 9/2015 | Lee et al. |

FOREIGN PATENT DOCUMENTS

| | | | |
|---|---|---|---|
| JP | 56161408 | A | 12/1981 |
| JP | S57158209 | A | 9/1982 |
| JP | 57-198714 | A | 12/1982 |
| JP | H0770328 | A | 3/1995 |
| JP | H08113653 | A | 5/1996 |
| JP | H11179107 | A | 7/1999 |
| JP | 2001079829 | A | 3/2001 |
| JP | 2005511304 | A | 4/2005 |
| JP | 2006299234 | A | 11/2006 |
| JP | 3961622 | B2 | 8/2007 |
| JP | 2009249415 | A | 10/2009 |
| JP | 4638734 | B2 | 2/2011 |
| JP | 5047616 | B2 | 10/2012 |
| JP | 2012219147 | A | 11/2012 |
| KR | 20140036866 | A | 3/2014 |
| KR | 20140063457 | A | 5/2014 |
| WO | 9220727 | A1 | 11/1992 |
| WO | 2006101271 | A1 | 9/2006 |
| WO | 2015175620 | A1 | 11/2015 |

OTHER PUBLICATIONS

International Search Report from PCT/KR2015/010684, dated Feb. 1, 2016.
Schwalm, Reinhold, "UV Coatings—Basics, Recent Developments and New Applications." Elsevier Science, Dec. 21, 2006, p. 115.
Odian, George, "Principles of Polymerization." John Wiley & Sons, Second Edition, Copyright 1981, p. 203.

*Primary Examiner* — Edward Johnson
(74) *Attorney, Agent, or Firm* — Lerner, David, Littenberg, Krumholz & Mentlik, LLP

(57) ABSTRACT

A method of preparing absorbent polymer granules is provided. The method of preparing fine particle granules according to the present disclosure may provide granules of which re-breaking is minimized due to a superior binding force between fine particles.

12 Claims, No Drawings

METHOD OF PREPARING SUPERABSORBENT POLYMER GRANULES

CROSS-REFERENCE TO RELATED APPLICATION

This application is a national phase entry under 35 U.S.C. § 371 of International Application No. PCT/KR2015/010684, filed Oct. 8, 2015, which claims priority to Korean Patent Applications No. 10-2014-0135922, filed Oct. 8, 2014, the disclosures of which are incorporated herein by reference.

TECHNICAL FIELD

The present disclosure relates to a method of preparing superabsorbent polymer granules.

BACKGROUND OF ART

A superabsorbent polymer (SAP) is a synthetic polymeric material capable of absorbing moisture at about 500 to 1000 times its own weight, and is also called a SAM (super absorbency material), an AGM (absorbent gel material), etc. Since superabsorbent polymers started to be practically applied in sanitary products, they have now been widely used not only for hygiene products such as disposable diapers for children, etc., but also for water retaining soil products for gardening, water stop materials for civil engineering and construction, sheets for raising seedlings, fresh-keeping agents for food distribution fields, and the like.

As a preparation process for such superabsorbent polymers, a process of reverse phase suspension polymerization and a process of solution polymerization have been known.

Of them, preparation of the superabsorbent polymer by reverse phase suspension polymerization is disclosed in, for example, Japanese Patent Laid-open Publication Nos. S56-161408, S57-158209, S57-198714, etc.

Further, preparation of the superabsorbent polymer by the solution polymerization further includes a thermal polymerization method in which a water-containing gel polymer is polymerized while being broken and cooled in a kneader equipped with a plurality of shafts, and a photo-polymerization method in which an aqueous solution with a high concentration is irradiated with UV rays on a belt to be polymerized and dried at the same time.

Meanwhile, in the preparation process of the superabsorbent polymer, fine particles are inevitably formed during a process of pulverizing the polymer. These fine particles function to deteriorate physical properties of the superabsorbent polymer, and the fine particles are separately recovered through size-sorting after pulverization and then reused. For example, a method of adding the fine particles during formation of a water-containing gel polymer has been suggested. However, when the fine particles are added during formation of the water-containing gel polymer, the fine particles scatter light to interfere with polymerization, and uneven polymerization is problematically induced to deteriorate physical properties of the resin.

Therefore, a method of regranulating the fine particles in a separate process has been suggested. This regranulating is a method of forming granules having a larger particle size than the fine particles by mixing the fine particle with a solvent. However, the fine particle granules formed by this method do not show a sufficient binding force between fine particles, and thus there is a disadvantage that most granules are easily re-broken. Accordingly, when the fine particle granules are used in the preparation of the superabsorbent polymer, there is a problem that the fine particle granules are re-broken to deteriorate physical properties of the polymer.

DETAILED DESCRIPTION OF THE INVENTION

Technical Problem

The present disclosure is intended to provide a method of preparing superabsorbent polymer granules that is capable of minimizing re-breaking of the granules.

Technical Solution

According to the present disclosure, a method of preparing superabsorbent polymer granules is provided, the method including:
  forming fine particle granules by mixing fine particles obtained during a preparation process of a superabsorbent polymer with an aqueous solvent containing a metal sulfate; and
  drying the fine particle granules by heating.

Further, according to the present disclosure, a method of preparing superabsorbent polymer granules is provided, the method including:
  forming fine particle granules by mixing fine particles obtained during a preparation process of a superabsorbent polymer with an aqueous solvent;
  mixing the fine particle granules with a metal sulfate; and
  drying the fine particle granules mixed with the metal sulfate by heating.

Hereinafter, a method of preparing a superabsorbent polymer according to embodiments of the present disclosure will be described.

The terminology used herein is only for the purpose of describing exemplary embodiments, and is not intended to limit the present disclosure.

The singular forms used herein may be intended to include the plural forms as well, unless the context clearly indicates otherwise. It will be understood that the term 'include', when used herein, specifies stated features, regions, integers, steps, operations, elements, and/or components, but does not preclude the presence or addition of other features, regions, integers, steps, operations, elements, components, and/or groups thereof.

The 'superabsorbent polymer', a synthetic polymeric material capable of absorbing moisture at about 500 to 1000 times its own weight, may be prepared, for example, by drying and pulverizing a water-containing gel polymer to form polymer particles, and then by crosslinking the surface of the particles. Such superabsorbent polymer may have a structure in which a surface-crosslinked layer is formed by surface crosslinking on an internally crosslinked polymer.

While terms including ordinal numbers, such as 'first', 'second', etc., may be used herein to describe various components, such components are not limited to those terms. The terms are only to distinguish one component from another. For example, a first component may be called a second component, and vice versa, without departing from the scope of the present disclosure.

Through continued studies of the present inventors, they found that when a metal sulfate is applied during granulation of fine particles of the superabsorbent polymer, a binding force between fine particles may be improved, thereby providing granules of which re-breaking is minimized. In this regard, the metal sulfate may be injected together with an aqueous solvent which is used in granulation of the fine particles, or injected immediately after granulation of the fine particles.

According to an embodiment of the present disclosure, a method of preparing superabsorbent polymer granules is provided, the method including:

forming fine particle granules by mixing fine particles obtained during a preparation process of a superabsorbent polymer with an aqueous solvent containing a metal sulfate; and drying the fine particle granules by heating.

Further, according to another embodiment, a method of preparing superabsorbent polymer granules is provided, the method including:

forming fine particle granules by mixing fine particles obtained during a preparation process of a superabsorbent polymer with an aqueous solvent;

mixing the fine particle granules with a metal sulfate; and drying the fine particle granules mixed with the metal sulfate by heating.

First, the superabsorbent polymer is prepared by a process of polymerizing and internally crosslinking acrylic acid-based monomers having acidic groups which are at least partially neutralized to form a water-containing gel polymer, a process of drying the water-containing gel polymer, a process of pulverizing the dried polymer, and a process of surface-modifying the pulverized polymer by using a surface crosslinking agent.

In the preparation process of the superabsorbent polymer, the acrylic acid-based monomer may be one or more compounds selected from the group consisting of acrylic acid, methacrylic acid, and a monovalent metal salt, a divalent metal salt, an ammonium salt, and an organic amine salt thereof. When acrylic acid or a salt thereof is used as the acrylic acid-based monomer, it is advantageous in that a superabsorbent polymer having improved absorbency may be obtained. Further, the acrylic acid-based monomer has acidic groups which may be at least partially neutralized with an alkali substance such as sodium hydroxide, potassium hydroxide, ammonium hydroxide, or the like. In this regard, a degree of neutralization may be about 40 mol % to 95 mol %, about 40 mol % to 80 mol %, or about 45 mol % to 75 mol %.

The polymerization of the acrylic acid-based monomers may be performed by thermal polymerization or photo-polymerization, and an appropriate polymerization initiator may be used in the polymerization. However, even though the photo-polymerization is performed, a certain amount of heat is generated by UV irradiation or the like and is also generated as the exothermic polymerization reaction proceeds. Therefore, the thermal polymerization initiator may be additionally used in the photo-polymerization.

The polymerization initiator may be added at a concentration of about 0.001% by weight to about 1% by weight, based on the monomer composition including the acrylic acid-based monomers, in consideration of a polymerization rate, a content of water-soluble components included in the polymer, absorbency under pressure of the polymer, etc.

The monomer composition includes a crosslinking agent to improve physical properties of the water-containing gel polymer. The crosslinking agent is a first crosslinking agent (internal crosslinking agent) for internal crosslinking of the water-containing gel polymer, and the crosslinking agent is separately used in a subsequent process, independent of the second crosslinking agent (surface crosslinking agent) for surface crosslinking of the water-containing gel polymer.

Specific examples of the first crosslinking agent may include N,N'-methylenebisacrylamide, trimethylolpropane tri(meth)acrylate, ethylene glycol di(meth)acrylate, polyethylene glycol(meth)acrylate, etc. The first crosslinking agent may be added at a concentration of about 0.001% by weight to about 1% by weight, based on the monomer composition, in consideration of the absorption rate, absorption power, gel strength, etc. of the polymer.

The polymerization of the monomer composition is largely classified into thermal polymerization and photo-polymerization according to a polymerization energy source, and the thermal polymerization may be carried out in a reactor like a kneader equipped with agitating spindles and the photo-polymerization may be carried out in a reactor equipped with a movable conveyor belt.

The water-containing gel polymer formed by the above method may have a water content of about 40% by weight to 80% by weight. In terms of optimizing the efficiency of a drying process described below, it is preferable that the water content of the water-containing gel polymer is controlled within the above range.

Subsequently, the water-containing gel polymer obtained by the above-described process is subjected to a drying process in order to provide the water-containing gel polymer with absorbency. In order to increase efficiency of the drying process, a process of (coarsely) pulverizing the water-containing gel polymer may be performed, before the drying process.

The coarse pulverization may be performed by a vertical pulverizer, a turbo cutter, a rotary cutter mill, a disc mill, a crusher, a chopper, etc. The coarse pulverization may be performed so that the water-containing gel polymer has a particle size of about 2 mm to about 10 mm.

The drying of the coarsely pulverized water-containing gel polymer may be performed at a temperature of 120° C. to 250° C. The drying is preferably performed so that the water content of the dried polymer is about 0.1% by weight to about 10% by weight, in order to prevent degradation of the polymer and failure of a subsequent process.

The process of pulverizing the dried polymer is used to optimize the surface area of the polymer, whereby the pulverized polymer has a particle size of 150 μm to 850 μm. In this regard, a pulverization device may include a pin mill, a hammer mill, a screw mill, a roll mill, a disc mill, a jog mill, or the like, which is generally used. In order to manage physical properties of the superabsorbent polymer finally produced, a process of selectively size-sorting polymer particles having a particle size of 150 μm to 850 μm from the polymer particles obtained through the pulverization process may be further performed.

The polymer pulverized by the above-described process is subjected to a surface modification process by a second crosslinking agent (surface crosslinking agent). Through the surface modification, a surface modification layer (surface crosslinking layer) may be formed on the surface of the pulverized polymer particles, thereby achieving more improved physical properties. Specific examples of the second crosslinking agent may include ethylene glycol diglycidyl ether, polyethylene glycol diglycidyl ether, glycerol polyglycidyl ether, propylene glycol diglycidyl ether, polypropylene glycol diglycidyl ether, ethylene glycol, etc. The second crosslinking agent may be added in an amount of about 0.001 parts by weight to about 5 parts by weight, based on 100 parts by weight of the pulverized polymer, in consideration of the efficiency of surface crosslinking, absorbency of the polymer, etc.

The fine particles of the superabsorbent polymer used in embodiments of the present disclosure may be produced throughout the above-described process of preparing the superabsorbent polymer, and in particular, mainly produced in the process of pulverizing the dried polymer.

For example, superabsorbent polymer particles having a particle size of more than 150 μm (preferably, more than 150 μm and 850 μm or less), which are obtained by the process of pulverizing the dried polymer, may have absorption performance suitable for commercialization. However, fine particles having a smaller particle size (e.g., a particle size of 10 μm or more and 150 μm or less) than superabsorbent polymer particles having the particle size suitable for commercialization deteriorate physical properties of the superabsorbent polymer and function to cause process troubles due to dust, etc., and therefore the fine particles are recovered through size-sorting.

With regard to the fine particles of the superabsorbent polymer thus obtained, in the present disclosure, the fine particles are mixed with an aqueous solvent to form fine particle granules composed of many fine particles.

In particular, according to an embodiment of the present disclosure, a metal sulfate is applied during formation of the fine particle granules or immediately after formation of the particle granules, thereby obtaining granules with high granulation strength.

For example, the fine particle granules may be formed by mixing the fine particles with an aqueous solvent containing a metal sulfate.

Here, the aqueous solvent may be used in an amount of 30 parts by weight to 300 parts by weight or 30 parts by weight to 200 parts by weight, based on 100 parts by weight of the fine particles. That is, to ensure uniform mixing and granulation strength of the fine particles, and to stably operate a machine, the aqueous solvent is preferably used in an amount of 30 parts by weight or more, based on 100 parts by weight of the fine particles. However, if an excessive amount of the aqueous solvent is used, it is hard to handle the granules, and drying efficiency of the granules may be reduced. Therefore, the aqueous solvent is preferably used in an amount of 300 parts by weight or less, or 200 part by weight or less, based on 100 parts by weight of the fine particles.

As the aqueous solvent, a common solvent applicable to the preparation of the superabsorbent polymer may be used. Non-limiting examples of the aqueous solvent may include one or more compounds selected from the group consisting of water, methyl alcohol, ethyl alcohol, n-propyl alcohol, isopropyl alcohol, n-butyl alcohol, isobutyl alcohol, t-butyl alcohol, acetone, tetrahydrofuran, N,N-dimethylformamide, and dimethyl sulfoxide. Among them, use of water as the aqueous solvent is advantageous in terms of granulation strength and process operation.

The metal sulfate used together with the aqueous solvent during formation of the fine particle granules may improve a binding force between fine particles to minimize rebreaking of the fine particle granules.

The metal sulfate may be used in an amount of 0.5 parts by weight to 50 parts by weight or 0.5 parts by weight to 30 parts by weight, based on 100 parts by weight of the fine particles. That is, to obtain improvement of the binding force between the fine particles, the metal sulfate is preferably used in an amount of 0.5 parts by weight or more, based on 100 parts by weight of the fine particles. However, when the metal sulfate is added in an amount exceeding a particular level, the binding force may not be further improved, and excessive addition of metal sulfate may reduce absorption performance of the fine particle granules. Therefore, the metal sulfate may be used in an amount of 50 parts by weight or less, or 30 parts by weight or less, based on 100 parts by weight of the fine particles.

The metal sulfate may be one or more compounds selected from the group consisting of zinc sulfate, magnesium sulfate, aluminum sulfate, iron sulfate, and zirconium sulfate.

The metal sulfate in a state dissolved in the aqueous solvent may be mixed with the fine particles. In this regard, a time from the point of contact between the aqueous solvent containing the metal sulfate and the fine particles to the point of formation of the fine particles granules is preferably 1 min or less, or 30 s or less, or 10 s or less. Therefore, the aqueous solvent containing the metal sulfate and the fine particles are preferably mixed at a high speed.

If the mixing time is long, it is difficult to uniformly mix the aqueous solvent with the fine particles, and therefore large agglomerates may be formed. If the mixing is continued for a long time after completion of the mixing, a content of water-soluble components of the superabsorbent polymer is increased or a mechanical load may be increased to generate problems in the process operation. This mixing process may be performed by using a common regranulator such as a mechanical stirring mixer.

The fine particle granules formed by the process may have a particle size of 30 mm or less, 0.1 mm to 30 mm, 0.1 mm to 20 mm, or 0.1 mm to 10 mm.

The fine particle granules may exhibit more improved granulation strength by the drying process. The drying process may be performed by a common method of heating the fine particle granules using a rotary dryer, a fluid bed dryer, an air dryer, an infrared dryer, etc. In this regard, the drying may be performed by heating at 100° C. to 250° C., 120° C. to 200° C., or 150° C. to 200° C. A drying time is not particularly limited, and the time may be preferably controlled within the range from 10 min to 10 h.

According to another embodiment of the present disclosure, a method of preparing superabsorbent polymer granules is provided, the method including:

forming fine particle granules by mixing fine particles obtained during a preparation process of a superabsorbent polymer with an aqueous solvent;

mixing the fine particle granules with a metal sulfate; and drying the fine particle granules mixed with the metal sulfate by heating.

The preparation method of the current embodiment is an example of changing a time point of metal sulfate injection in the previously described method of an embodiment, and in this method, the metal sulfate is not added during granulation of the fine particles, but is mixed with the fine particle granules immediately after granulation of the fine particles. That is, the preparation method of the current embodiment may be performed by mixing the fine particles of the superabsorbent polymer with the aqueous solvent to form fine particle granules, mixing the fine particle granules with the metal sulfate, and then drying the mixture.

Here, the metal sulfate in a state of being dissolved in the aqueous solvent may be mixed with the fine particle granules. In addition, the fine particles, the aqueous solvent, the metal sulfate, the methods of forming and drying the fine particle granules, etc. are the same as described above.

As such, in the formation of the fine particle granules, the metal sulfate may be added during granulation of the fine particles or immediately after granulation of the fine particles, thereby preparing fine particle granules showing a superior binding force between fine particles.

Advantageous Effects

A method of preparing fine particle granules according to the present disclosure may provide fine particle granules of which re-breaking is minimized due to a superior binding force between fine particles.

DETAILED DESCRIPTION OF THE EMBODIMENTS

Hereinafter, the preferred examples are provided for better understanding. However, these examples are provided for illustrative purposes only, and the present disclosure is not intended to be limited by these examples.

Preparation Example

About 5.0 g of N,N'-methylene-bis-acrylamide (first crosslinking agent) was added to and mixed with about 500 g of acrylic acid. Then, about 971.4 g of a 20% sodium hydroxide aqueous solution was added thereto to prepare a monomer composition (a degree of neutralization of acrylic acid-based monomer: 70 mol %).

The monomer composition was fed into a 5 L twin-armed kneader equipped with a sigma-type axis, and maintained at 40° C. and purged with nitrogen gas for 30 min to eliminate oxygen dissolved in the aqueous solution. Under stirring, about 50.1 g of a 0.2 wt % L-ascorbic acid aqueous solution, about 50.5 g of a sodium persulfate aqueous solution, and about 51.0 g of 2.0 wt % hydrogen peroxide aqueous solution were added. Polymerization was initiated within 20 seconds, and a gel-type polymer was obtained. The gel-type polymer was injected into a chopper, and pulverized using a shearing force for 30 min to obtain a gel having a particle size of 2 mm to 10 mm.

The coarsely pulverized gel was spread as thick as about 30 mm on a stainless wire gauze having a hole size of 600 μm and dried in a hot air oven at 140° C. for 5 h. The dried gel thus obtained was pulverized with a grinder and then size-sorted through an ASTM standard sieve. As a result, a polymer having a particle size of 150 μm to 850 μm was obtained.

100 g of the obtained crosslinked polymer was uniformly blended with a surface crosslinking solution including 0.3 g of ethylene glycol diglycidyl ether (second crosslinking agent), 3 g of methanol, and 3 g of water. Then, the mixture was dried in a hot air oven at 140° C. for 30 min. The dry powder was size-sorted through an ASTM standard sieve to obtain absorbent polymer particles having a particle size of 150 μm to 850 μm.

Example 1

In the preparation process of the absorbent polymer according to the preparation example, polymer particles were size-sorted to obtain fine particles having a particle size of 10 μm to 150 μm.

100 g of the fine particles were put in a mechanical stirring mixer. While the mixer was rotated at a high speed, a mixed solution of 1 g of aluminium sulfate and 100 g of water was added thereto. The mixing was performed for about 20 s, and gel-type fine particle granules of about 2 mm to 10 mm were formed.

The fine particle granules were spread on a stainless wire gauze having a hole size of 300 μm and dried in a hot air oven at 140° C. for 5 h.

Example 2

In the preparation process of the absorbent polymer according to the preparation example, polymer particles were size-sorted to obtain fine particles having a particle size of 10 μm to 150 μm.

100 g of the fine particles were put into a mechanical stirring mixer. While the mixer was rotated at a high speed, 90 g of water was added thereto. The mixing was performed for about 20 s, and gel-type fine particle granules of about 2 mm to 10 mm were formed. Subsequently, a mixed solution of 1 g of aluminium sulfate and 10 g of water was added thereto, and mixed for about 20 s.

The fine particle granules were spread on a stainless wire gauze having a hole size of 300 μm and dried in a hot air oven at 140° C. for 5 h.

Comparative Example 1

Fine particle granules were prepared in the same manner as in Example 1, except that aluminium sulfate was not added during formation of fine particle granules.

Experimental Example

The fine particle granules prepared in the examples and the comparative example were repulverized, and then size-sorted. Their distributions are shown in the following Table 1.

In this regard, changes in the sizes of the particles produced after pulverization may occur depending on granulation strength. When the granulation strength is low, a ratio of the granules to be repulverized to fine particles is high, and particles having a relatively small size are generated in a large amount.

TABLE 1

|  | 600 μm or more | 300 μm or more and less than 600 μm | 150 μm or more and less than 300 μm | Less than 150 μm |
|---|---|---|---|---|
| Example 1 | 27.6% | 30.4% | 15.5% | 26.5% |
| Example 2 | 27.3% | 29.7% | 18.5% | 24.5% |
| Comparative Example 1 | 20.1% | 23.4% | 20.8% | 35.7% |

Referring to Table 1, the fine particle granules according to the examples showed a low ratio of the fine particles having a size of less than 150 μm, and a high ratio of the fine particles having a size of 300 μm or more, compared to the granules of the comparative example. Accordingly, it was confirmed that the fine particle granules of the examples showed a low ratio of the fine particle granules to be repulverized to fine particles, and high granulation strength.

The invention claimed is:

1. A method of preparing superabsorbent polymer granules, the method comprising:
   mixing particles consisting of fine particles having a particle size of 150 μm or less obtained during a preparation process of a superabsorbent polymer with an aqueous solvent containing a metal sulfate to increase a binding force between the fine particles in forming fine particles granules, wherein the mixing of the fine particles with the aqueous solvent containing the metal sulfate is performed in 1 minute or less; and
   drying the fine particle granules by heating.

2. A method of preparing superabsorbent polymer granules, the method comprising:

mixing particles consisting of fine particles having a particle size of 150 μm or less obtained during a preparation process of a superabsorbent polymer with an aqueous solvent to form fine particle granules;

mixing the fine particle granules with a metal sulfate to increase a binding force between the fine particles in the fine particle granules; and drying the fine particle granules mixed with the metal sulfate by heating.

3. The method of preparing superabsorbent polymer granules of claim 1, wherein the aqueous solvent is used in an amount of 30 parts by weight to 300 parts by weight, based on 100 parts by weight of the fine particles.

4. The method of preparing superabsorbent polymer granules of claim 1, wherein the aqueous solvent is one or more compounds selected from the group consisting of water, methyl alcohol, ethyl alcohol, n-propyl alcohol, isopropyl alcohol, n-butyl alcohol, isobutyl alcohol, t-butyl alcohol, acetone, tetrahydrofuran, N,N-dimethylformamide, and dimethyl sulfoxide.

5. The method of preparing superabsorbent polymer granules of claim 1, wherein the metal sulfate is used in an amount of 0.5 parts by weight to 50 parts by weight, based on 100 parts by weight of the fine particles.

6. The method of preparing superabsorbent polymer granules of claim 1, wherein the metal sulfate is one or more compounds selected from the group consisting of zinc sulfate, magnesium sulfate, aluminum sulfate, iron sulfate, and zirconium sulfate.

7. The method of preparing superabsorbent polymer granules of claim 1, wherein the drying is performed by heating at 100° C. to 250° C.

8. The method of preparing superabsorbent polymer granules of claim 2, wherein the aqueous solvent is used in an amount of 30 parts by weight to 300 parts by weight, based on 100 parts by weight of the fine particles.

9. The method of preparing superabsorbent polymer granules of claim 2, wherein the aqueous solvent is one or more compounds selected from the group consisting of water, methyl alcohol, ethyl alcohol, n-propyl alcohol, isopropyl alcohol, n-butyl alcohol, isobutyl alcohol, t-butyl alcohol, acetone, tetrahydrofuran, N,N-dimethylformamide, and dimethyl sulfoxide.

10. The method of preparing superabsorbent polymer granules of claim 2, wherein the metal sulfate is used in an amount of 0.5 parts by weight to 50 parts by weight, based on 100 parts by weight of the fine particles.

11. The method of preparing superabsorbent polymer granules of claim 2, wherein the metal sulfate is one or more compounds selected from the group consisting of zinc sulfate, magnesium sulfate, aluminum sulfate, iron sulfate, and zirconium sulfate.

12. The method of preparing superabsorbent polymer granules of claim 2, wherein the drying is performed by heating at 100° C. to 250° C.

\* \* \* \* \*